Figure 1:
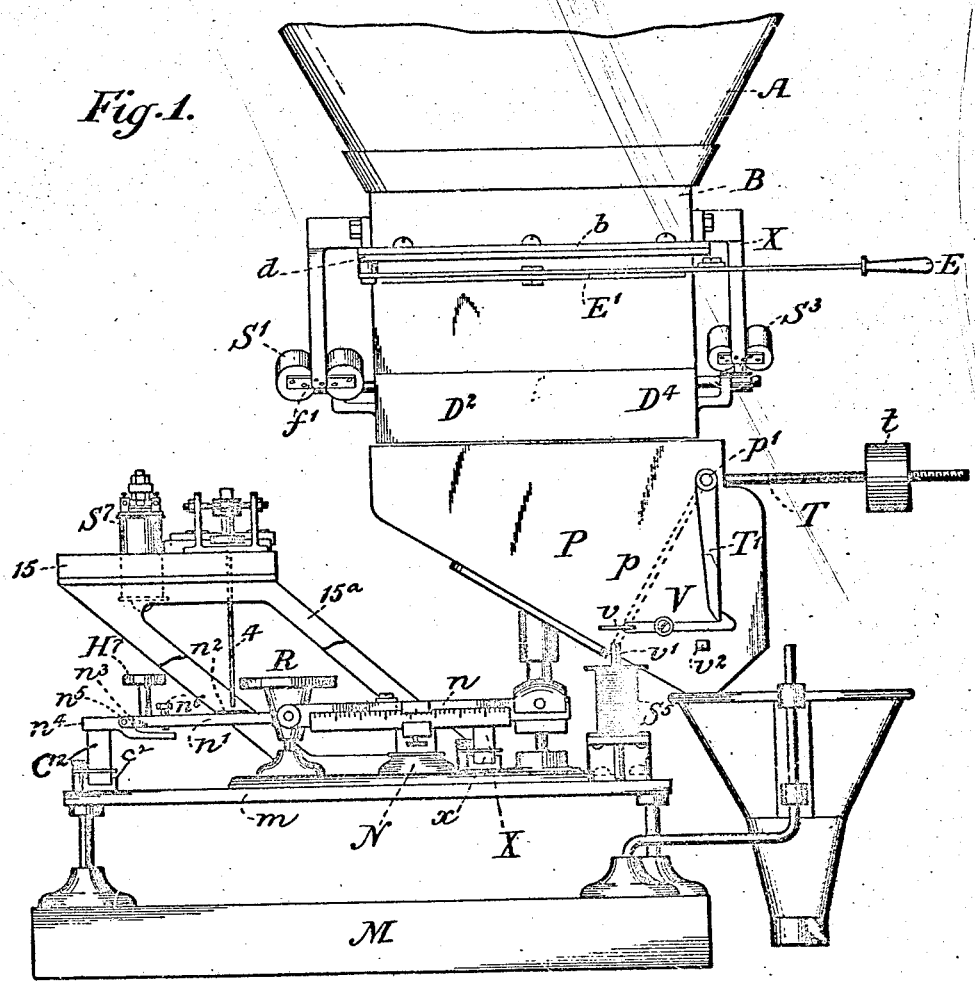

No. 895,524. PATENTED AUG. 11, 1908.
T. R. WEYANT.
AUTOMATIC WEIGHING MACHINE.
APPLICATION FILED SEPT. 27, 1906.

3 SHEETS—SHEET 1.

WITNESSES:

INVENTOR
Thomas Romer Weyant
BY R. H. E. Ito
ATTORNEY.

No. 895,524. PATENTED AUG. 11, 1908.
T. R. WEYANT.
AUTOMATIC WEIGHING MACHINE.
APPLICATION FILED SEPT. 27, 1906.

3 SHEETS—SHEET 2.

WITNESSES:
INVENTOR
BY
ATTORNEY.

No. 895,524. PATENTED AUG. 11, 1908.
T. R. WEYANT.
AUTOMATIC WEIGHING MACHINE.
APPLICATION FILED SEPT. 27, 1906.

3 SHEETS—SHEET 3.

WITNESSES:
H. H. Roberts
H. R. Bauer

INVENTOR
Thomas Romer Weyant.
BY R. H. E. Starr,
ATTORNEY.

UNITED STATES PATENT OFFICE.

THOMAS ROMER WEYANT, OF NEW YORK, N. Y.

AUTOMATIC WEIGHING-MACHINE.

No. 895,524.     Specification of Letters Patent.     Patented Aug. 11, 1908.

Application filed September 27, 1906. Serial No. 336,426.

*To all whom it may concern:*

Be it known that I, THOMAS ROMER WEYANT, a citizen of the United States, and a resident of the city, county, and State of New York, have invented certain new and useful Improvements in Automatic Weighing-Machines, of which the following is a specification.

My invention relates to improvements in automatic weighing machines and is especially well adapted for use where it is desired, rapidly and accurately, to weigh with one machine different substances in quantities varying considerably in amount. For example, a machine which will weigh ounces with satisfactory accuracy and speed, while it might weigh 5 pounds or upwards with satisfactory accuracy, would not ordinarily weigh such amounts with sufficient speed for commercial purposes.

By the use of my invention, I can weigh small quantities with accuracy and can also weigh large quantities with equal accuracy and with approximately the same speed. My preferred method of accomplishing this result is to have not only what I may call a drip stream coming from the hopper to the scale pan, but also a main stream, the extent of which can preferably be regulated to a predetermined degree. Preferably also these main streams can be used or shut off at will. In such a construction, I prefer to have what may be described as the drip stream sufficiently small to deliver the substance which is being weighed with sufficient slowness to permit the weighing device to actuate the closing device or valve, which controls the drip stream, with sufficient rapidity to get the accuracy commercially necessary for the particular product to be weighed. In this case I simultaneously use the main stream and the "drip" stream to deliver to the scale pan rapidly a little less than the entire amount to be weighed. Then I cut off the main stream and continue the "drip" stream to complete the entire weight. Obviously, no matter what weight is desired, one of the tests of highest efficiency is to deliver the required weight within the limit of accuracy set by the trade, and with the greatest possible rapidity. I believe the best manner of accomplishing this result is to have two streams, first the "drip" stream, and second, the main; to have each of these streams adjustable at will to a predetermined extent; to provide means for automatically cutting off the main stream when any predetermined proportion of the total weight desired has been delivered to the scale pan; and finally to provide automatic means for switching or deflecting the "drip" stream from the scale pan to which it has been delivering to another scale pan immediately upon the delivery to the first of the total weight desired. Furthermore, where two scale pans are used, as is always preferable, it is desirable to have two main streams automatically controlled so that immediately upon either scale pan being in operative and receiving position, its main stream will start delivering thereto.

Of course, precaution must be taken to provide automatic means, first, for preventing the possibility of too much material being delivered to either scale pan; second, for discharging the contents of each scale pan with reasonable rapidity; third, for preventing the possibility of either the drip stream or the main stream commencing to deliver to either scale pan until after the same has discharged its preceding load and returned to operative receiving position; and, fourth, for automatically bringing the scale pan to a closed or upright or other proper position for receiving a load promptly after discharging the preceding load.

Figure 2:
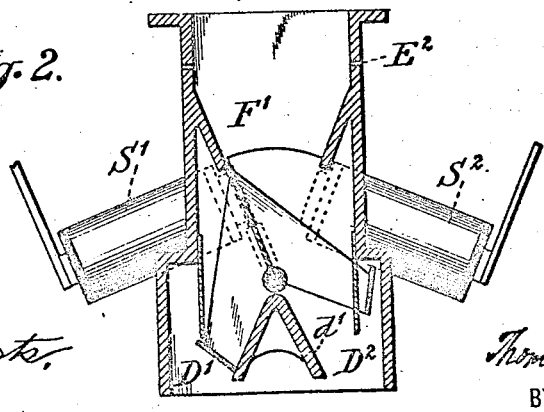
Figure 3:
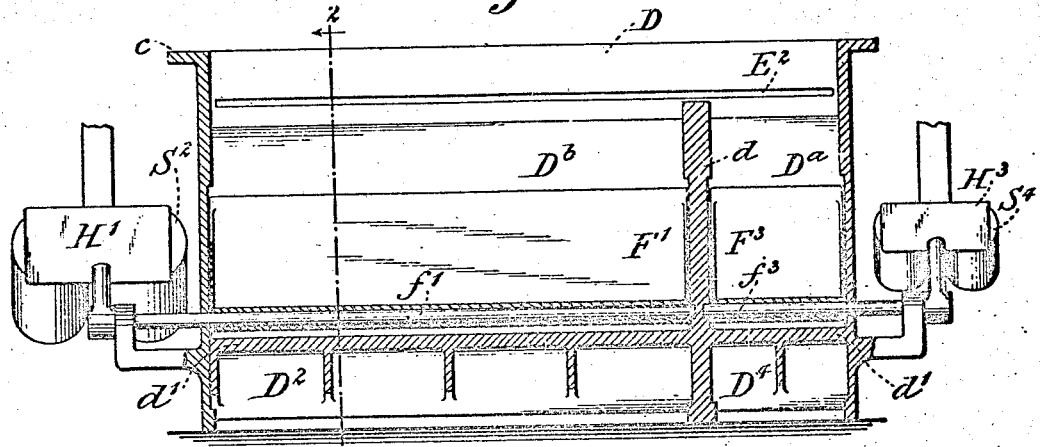
Figure 4:
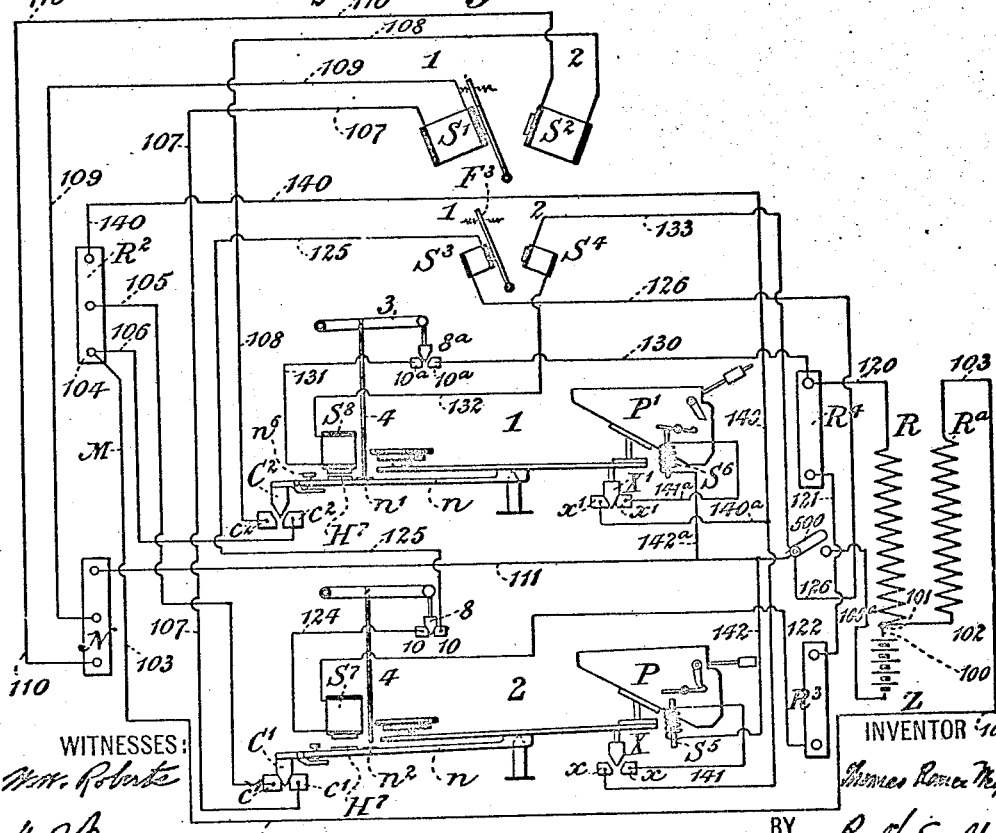
Figure 5:
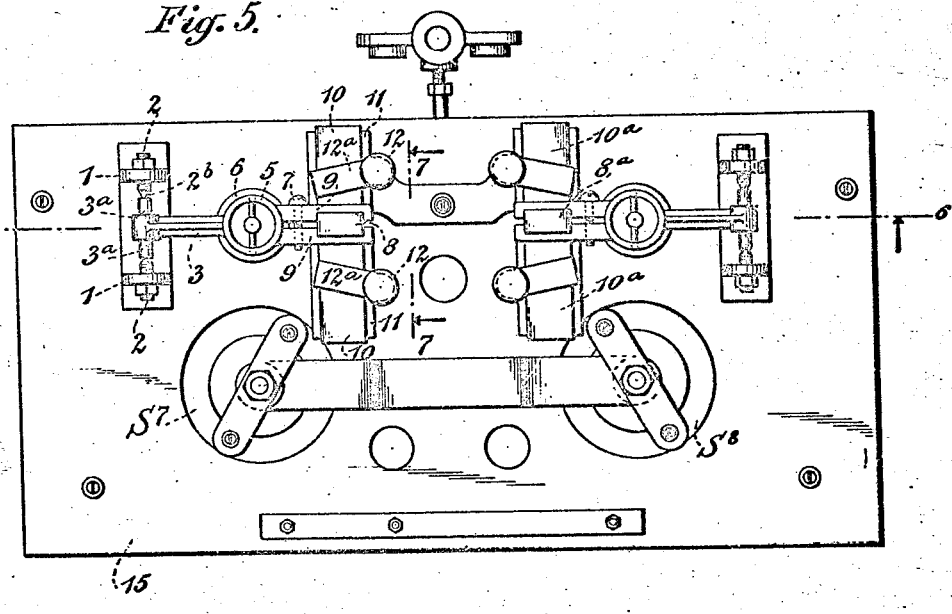
Figure 6:
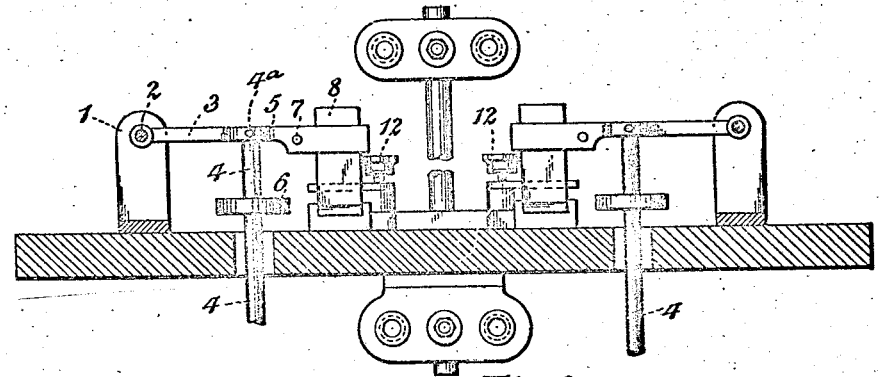
Figure 7:
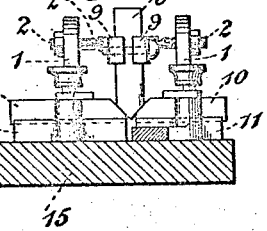
Figure 8:
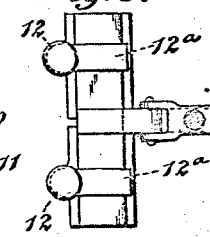

I will now describe a preferred form of my invention which I have illustrated in the accompanying drawings, in which similar reference characters designate corresponding parts, and in which, Figure 1 is a side elevation of a weighing machine embodying my invention; Fig. 2 is a vertical transverse section of the feed chamber and a controlling valve or deflector taken on line 2—2 of Fig. 3; Fig. 3 is a vertical longitudinal section of the drip and main feed chambers, the deflectors and their operating devices being shown in elevation and the deflectors being in opposite position to that shown in Fig. 2. Fig. 4 is a diagrammatic view representing electrical connections and wiring; Fig. 5 is a plan view illustrating the preferred form of circuit controlling devices, etc.; Fig. 6 is a vertical section taken on the line 6—6 of Fig. 5; Fig. 7 is a vertical section taken at right angles to Fig. 6 and on the line 7—7 of Fig. 5; Fig. 8 is a plan view of a detail.

Referring now to these drawings, A designates a hopper of any suitable shape or construction.

B designates a casting at the lower end of the hopper, provided with a flange $b$ connected by bolts or screws or any other suitable means to a flange $d$ on the upper end of the delivery chamber D.

E designates a handle connected with a suitable valve or controlling device E' working in a slit E² for the purpose of closing and also controlling the passage from the hopper to the delivery chamber. This valve may be of any suitable kind, although I prefer that illustrated in my earlier application, Serial No. 323,672, filed June 27th, 1906.

As shown in Fig. 3, the delivery chamber is divided into two compartments $D^a$ and $D^b$ by a vertical transverse partition $d$. As shown in Figs. 2 and 3, each of these compartments is, at its lower portion, divided into two chutes by means of the triangular partition $d'$ extending longitudinally from end to end of the feed chamber D.

The compartment $D^b$, which is the main feed compartment, is divided by a triangular shaped partition $d^1$ at its lower part into two chutes $D^1$ and $D^2$. The compartment $D^a$, which is a drip feed compartment is also divided by a triangular shaped partition $d^1$ into two chutes similar to the chutes $D^1$ and $D^2$. In the drawings, however, only one of these chutes is shown and marked $D^4$. It will, however, be understood that a similar chute will be in line with the chute $D^1$.

Each of the delivery chutes of each of the delivery compartments is automatically controlled and as shown by centrally arranged valves or deflectors F'—F³—F' controlling the chutes of chamber $D^b$ and F³ the chutes of chamber $D^a$.

The deflector F' is rigidly secured to and oscillates with a shaft $f'$ to the outer end of which is secured an armature H' which is moved backward and forward by two double magnets, indicated by S' and S² respectively. The deflector F³ is rigidly secured to another shaft $f^3$, to the outer end of which is rigidly secured another armature H³, controlled by another set of two double magnets S³ and S⁴. The method of arranging both of these sets of double magnets is the same in the particular form illustrated—one double magnet of each set being secured in any suitable manner on one side of the shaft carrying a deflector and an armature, and the other double magnet of each set on the opposite side of the shaft. Obviously, whenever the deflector for the main chamber $D^b$ is in one position or pulled over by the double magnet S', the main delivery chute $D^2$ will be opened and D' closed. When attracted and held closed to the double magnet S² the position will be reversed and the delivery chute D' open and $D^2$ closed as illustrated in Fig. 2.

The same statement applies to the drip compartment $D^a$, the delivery chute $D^4$ being opened when the armature is drawn and held against the double magnet S³ and closed when against the magnet S⁴. By means of electrical connections which I will describe later on, each and all of these double magnets is energized whenever the circuit containing the same is closed and furthermore is normally always energized in the sense that the circuits including the opposing magnets are often simultaneously energized, whereas only one of the same is ever broken at the same time. Consequently, it is the deënergizing of one of the opposing magnets which causes the movement of the armature and deflector and not the energizing thereof. To put it differently, both magnets, being energized and one of them becoming suddenly deenergized, owing to a sudden breaking of its circuit, the other magnet exercises its influence unopposed and actuates the deflector.

Turning now to the scales or weighing apparatus—M designates a suitable support of any suitable character, on which is mounted a platform $m$ on which are mounted or supported two or more scales or suitable weighing apparatus. Only one weighing apparatus is illustrated in detail, but two are indicated in the diagrammatic view, Fig. 4. Each weighing apparatus being a substantial duplicate of the other, a description of one is sufficient. As shown N designates a standard carrying a balance beam $n$ on one end of which is mounted a scale pan P and on the other a weight platform R. As shown $n'$ designates an extension of the balance beam or an extension otherwise suitably secured to the weight platform end of the balance beam, and carrying a piece of insulation $n^2$. Arranged near the outer end $n^3$ of this extension is an armature H⁷. Mounted at the outer end of the extension $n'$ is a lever arm $n^4$ pivoted at the point $n^5$ and carrying a contact pencil C² for making and breaking contact with two carbon plates or pencils $c^2$. This contact maker and breaker C² controls the circuit for energizing the magnet S². On the other scale (not shown) a similar lever arm $n^4$ carries a similar carbon pencil C' coöperating with the contact plates $c'$ to control the magnet S'. On the extension $n'$ of each scale is arranged a screw $n^6$ adapted to be screwed up and down and to project downwards through said extension to coact with the inner end of the lever arm $n^4$ to limit the movement thereof, independent of the extension $n'$. In other words, it will depend upon how far this screw $n^6$ projects below the under surface of the extension $n'$ as to how much upward movement the extension $n'$ and the weight platform would have before lifting the contact C' or C² to break its respective circuit. As it is the breaking of the circuits at C' and C², respectively, that deënergizes the magnets S' and S², respectively it is obvious that the precise point of the downward movement of the scale pan by which the circuit will be broken, will depend upon the adjustment of these screws $n^6$.

I will now describe the electrical circuits for connecting and operating the devices just described.

Line 100 designates a connecting wire leading from any suitable source of supply and also connecting with the point 101 which may be a binding post connected with the resistance R. Line 102 may be a continuation of line 100 connecting the same to one end of resistance coil $R^a$ from which leads the line 103 to a binding post or other suitable connection 104 on a bus bar $R^2$. From this bar line 105 leads to the contact maker and breaker C' and line 106 to the contact maker and breaker $C^2$. From C' line 107 leads to the magnet S' and through the same and then by line 109 to the bus bar N from which the line 111 leads back to the main switch 500 to the negative line $100^a$ and thence back to the source of supply. From the other contact $C^2$ the line 108 leads to the magnet $S^2$ through which the current passes to the line 110 and thence to the bus bar N from which the current passes as above stated to the line 111 and the main switch 500 to the negative line $100^a$. Obviously the magnets S' and $S^2$ will always be energized excepting when one of the contacts C' and $C^2$ respectively, controlling the same is broken. Furthermore if the screws $n^6$ are driven down sufficiently far to cause the lever arm $n^4$ to start upward, simultaneously with the extension $n'$ then the contact will be broken practically immediately upon the scale pan starting to descend. As a result the deflector F' of the main delivery chamber $D^b$ will immediately be actuated upon the slightest movement of the scale pan. On the other hand by loosening the screw $n^6$ somewhat the circuit will not be broken until the scale pan has descended somewhat further because the pivotal connection between the lever arm $n^4$ and the extension $n'$ allows the extension $n'$ to move independently until the lever arm $n^4$ has rocked on its pivot and engaged the screw $n^6$. Consequently, the deflector need not be actuated until the scale pan has movement downwards to a variable degree, depending upon the adjustment of the screw $n^6$. I will point out the precise utility of this arrangement in my description of the general operation of the device.

I will now describe the means for operating the deflector $F^3$ in the drip-feed chamber $D^a$. As before described, the movement of this deflector is controlled by magnets $S^3$ $S^4$.

Referring now to Figs. 1, 5, 6, 7 and 8, it will be seen that a table 15 of slate, or other non-conducting material is supported by brackets $15^a$ upon the table $m$. Upon the table 15 are supported two sets of devices for making and breaking the circuits of magnets $S^3$ and $S^4$, and as one set of devices is like the other, a description of one is sufficient. 1, 1, indicate posts secured to the table 15, each having at its upper end an adjustable screw 2, having a conical inner end $2^b$. These conical ends $2^b$ serve as pivots for trunnions $3^a$ extending from opposite sides of a lever 3. The lever is provided with an annular portion 5 from which extends a pair of spring arms 9, 9, adapted to receive between them a carbon pencil, or contact 8, and a set screw 7 serves to draw said arms toward each other to clamp said carbon contact between them. A pin $4^a$ is journaled in the annular portion 5 of the lever 3 and from said pin a rod 4 depends down to within a short distance of the insulation $n^2$ on the extension $n'$ of the scale beam. 10—10 indicate carbon pencils, slidably supported in supports 11 on the table 15. These carbon pencils 10 may be held in adjusted position by clamping plates $12^a$ and set screws 12. The carbon pencils 10 form the terminals of conducting wires which may be connected to them in any suitable manner. As shown clearly in Fig. 7, the pencils 8 and the pencils 10 have beveled surfaces which coöperate to insure a good contact. Upon the table 15 is also supported two magnets $S^7$ and $S^8$ adapted when energized to attract the armatures $H^7$ upon the respective scale beams, so soon as said armatures are brought within their magnetic fields by the upward movement of the respective scale beams. As before stated, the circuit making devices for the respective magnets $S^3$ and $S^4$ are alike, the one specifically described being for magnet $S^3$. In the devices for magnet $S^4$ the contact pencils are marked $8^a$ and $10^a$ for the sake of distinction. The magnet $S^7$ is in the same circuit as the magnet $S^3$, and the magnet $S^8$ in the same circuit as magnet $S^4$.

I will now describe the circuit for magnets $S^3$ and $S^7$, referring to Fig. 4. Current from the main line 100 passes through resistance R, to line 120, bus bar $R^4$ line 121, bus bar $R^3$, line 122, through magnet $S^7$, line 124, contacts 10—8—10, line 125, through magnet $S^3$, line 126, main switch 500 to negative main line $100^a$.

The circuit for magnets $S^4$ and $S^8$. Current from the main line 100 passes through resistance R to line 120, bus bar $R^4$, line 130, contacts $10^a$—$8^a$—$10^a$, line 131, magnet $S^8$, line 132, through magnet $S^4$, line 133, main switch 500 to negative main line $100^a$.

The operation of this part of the apparatus is as follows: With the circuits closed as shown in Fig. 4, the magnets S', $S^3$ and $S^7$ are energized and the deflectors F' and $F^3$ are in position to discharge both the "drip" stream and the main stream into scale pan P. When sufficient material has been received by the scale pan P to cause it to begin to descend, the circuit will first be broken at C'. As before stated, the extent of downward movement of the scale pan necessary to break the circuit at C' may be regulated by the screw $n^6$. In the event the material or commodity being weighted is free flowing and heavy proportionately to its bulk, as for example, shot or rice, the circuit should be broken at C' directly the scale pan starts to move downwardly, and consequently the screw $n^6$ should be in engagement with the lever $n^4$ to cause the extension $n'$ and the lever to start to move simultaneously. With lighter and more bulky materials, however, such as oatmeal, the extension $n'$ may be permitted to move a short distance independently of the lever $n^4$, and the extent of such independent movement will be regulated, as before stated, by the screw $n^6$.

While the magnet $S^7$ will be energized the armature $H^7$ is so arranged in relation thereto that it will not be attracted thereby until the extension $n'$ has moved up beyond a point necessary to break the circuit at C' and thereby permit the deflector F' to be pulled over by magnet $S^2$ and so shut off the main stream to the scale pan P. After the main stream is shut off the drip stream will still flow into the scale pan P until the extension $n'$ moves up sufficiently to bring the armature within the magnetic field of the magnet $S^7$ and then the extension will be drawn up rapidly by the magnet $S^7$, engage the rod 4 and thereby break the circuit for the magnets $S^3$ and $S^7$ at 8. Of course, when the circuit was broken at C' the deflector was moved to cause the main stream to flow into the scale pan P', and as soon as the circuit for magnet $S^3$ is broken the deflector $F^3$ will be moved to direct the drip stream also into scale pan P'. In Fig. 4, scale pan P' is supposed to be discharging its load, but as soon as a scale pan is emptied the weight on its balance beam will elevate it and this will close its circuits through both its main and drip stream controlling magnets.

I will now describe a preferred form of discharge controlling mechanism for the scale pans.

As shown in Fig. 1, $p$ indicates a swinging bottom or door for the scale pan P, secured at its upper edge to a shaft $p'$ journaled in the sides of the scale pan P. A lever T is secured to the shaft $p'$ and projects outwardly therefrom: The lever has a threaded portion on which is a weight $t$. The parts are to be so proportioned that the weighted lever will somewhat more than counterbalance the swinging door and therefore normally hold the door closed. When material is in the scale, however, its pressure on the bottom will tend to open the door and it is therefore necessary to provide means for detachably locking the door in closed position. As shown, I provide a lever arm T' secured to shaft $p'$ outside the pan and extending downwardly at substantially a right angle to lever T. A latch V is pivoted between its ends on the side of the scale pan and is provided with a hooked end to engage the end of lever T' and thereby lock the door $p$ against opening. The other end of the latch is provided with a plate $v$ in the path of movement of the core $v'$ of a solenoid $S^5$, and this end of the latch is heaviest and normally holds the hooked end in engagement with the lever arm T'. When the solenoid $S^5$ is deënergized its core $v'$ will fall by gravity and may be supported in any suitable manner. When the solenoid is energized its core will move upwardly and strike the plate $v$ and thereby disengage the latch V and lever arm T' and thus permit the door $p$ to open and discharge the load from scale pan P. Preferably a stop $v^2$ will be provided to limit the movement of the latch. It is, of course, necessary that the solenoid shall not operate until the scale pan has received its complete load. To accomplish this, I preferably connect a contact X to the scale beam $n$ near the scale pan P adapted to engage contacts $x$—$x$ when the scale pan reaches its lowest point and thereby close a circuit through the solenoid $S^5$. This circuit is shown in Fig. 4 as follows: from main supply wire 100 to resistance $R^a$, line 103, bus bar $R^2$, line 140, contacts $x$—$X$—$x$, line 141, through solenoid coils to line 142, line 111 to main switch 500 and negative line $100^a$. As soon therefore as the scale pan has received its full load and descended, a circuit will be closed through the solenoid $S^5$ and the door $p$ released.

Similar devices are of course employed for scale pan P' and in this case the solenoid is indicated by $S^6$ and the contact points by X' and $x'$. In this case the circuit is the same up to and including line 140 as for solenoid $S^5$, then a branch $140^a$ leads from line 140 to contacts $x'$—X'—$x'$ line $141^a$, through solenoid $S^6$ to line $142^a$, line 111, switch 500 to negative main line.

It will, of course, be understood that the necessary current may be derived from any suitable source and, for convenience, I have illustrated a battery Z.

Instead of having the core $v'$ of the solenoid project downwardly through the coils of the solenoid $S^5$ as shown in Fig. 1, the upper portion of said core may be of non-magnetic material in which case said core need not extend below the coils.

Without limiting myself to the precise details of construction illustrated and described, I claim 1. In an automatic weighing machine, the combination with two scales, of two feed chambers each having two delivery spouts, a deflector in each chamber for deflecting the flow of material through its spouts alternately, and means operated by the movement of the scales for controlling the said deflectors.

2. In an automatic weighing machine, the combination with two scales, of two independent feed chambers each having two delivery spouts, one spout from each chamber discharging into one scale pan, and the other of said spouts discharging into the other scale pan, a deflector in each chamber for deflecting the flow of material through its spouts alternately, and means operated by the movement of the scales for independently controlling the deflectors.

3. In an automatic weighing machine, the combination with two scales, of a drip feed chamber and a main feed chamber, each of said chambers having two delivery spouts, a deflector in each chamber for deflecting the flow of material through its spouts alternately, and means operated by the movement of the scale for moving the deflector in the main feed chamber, and other means operated by the movement of the scale pan for moving the deflector in the drip feed chamber.

4. In an automatic weighing machine, the combination with two scales, of a main feed chamber having two delivery spouts, a drip feed chamber having two delivery spouts, one spout of each chamber discharging into one scale pan, and the other spout of each chamber discharging into the other scale pan, a deflector in each chamber for deflecting the flow of material from its spouts alternately, and electro magnetic devices controlled by the movement of the respective scales for first controlling its main feed and subsequently its drip feed.

5. In an automatic weighing machine, the combination with two scales, of a main feed chamber having two delivery spouts, a drip feed chamber having two delivery spouts, one spout of each chamber discharging into one scale pan, and the other spout of each chamber discharging into the other scale pan, a deflector in each chamber for deflecting the flow of material through its spouts alternately, electro-magnetic devices controlled by the movement of the respective scale beams for first controlling the main feed to its scale pan and subsequently its drip feed, and other electro magnetic devices for accelerating the movement of the scale beam to control the drip feed.

6. In an automatic weighing machine the combination with two scales, of a main feed chamber having two delivery spouts, a drip feed chamber having two delivery spouts, one spout of each chamber discharging into one scale pan, and the other spout of each chamber discharging into the other scale pan, a deflector in each chamber for deflecting the flow of material through its spouts alternately, electro - magnetic devices controlled by the movement of the respective scale beams for first controlling the main feed to its scale pan and subsequently its drip feed, other electro-magnetic devices for accelerating the movement of the scale beam to control the drip feed, and mechanical devices for varying the interval between the action of the electro-magnetic devices which control the main feed, and that of the electro-magnetic devices which control the drip feed.

7. In an automatic weighing machine, the combination with two scales, of a main feed chamber having two delivery spouts, a drip feed chamber having two delivery spouts, one spout of each chamber discharging into one scale pan and the other spout of each chamber discharging into the other scale pan, a deflector in each chamber for deflecting the flow of material through the spouts alternately, electro-magnetic devices controlled by the movement of the respective scale beams for first controlling the main feed to its scale pan and subsequently its drip feed, and mechanical devices for varying the interval between the action of the electro-magnetic devices which control the main feed and that of the electro-magnetic devices which control the drip feed.

8. In an automatic weighing machine, the combination with a scale beam having a scale pan at one end and a weight at the other, of a hopper having a spout to discharge into the scale pan, a valve for controlling the discharge from the spout, an electric motor for operating the valve, separated contacts included in the motor circuit, a lever pivotally connected to the weight end of the scale beam and carrying a contact for engaging the circuit contacts, and adjustable means for varying the movement of the scale beam relatively to said lever.

9. In an automatic weighing machine, the combination with a scale beam having a scale pan at one end and a weight at the other, of a hopper having a spout to discharge into the scale pan, a valve for controlling the discharge from the spout, an electric motor for operating the valve, separated contacts included in the motor circuit, an arm extending from the weight end of the scale beam, a lever pivoted between its ends to said arm, a contact carried by one end of the lever for engaging the circuit contacts, and an adjustable device on said arm to engage the other end of the lever for varying the movement of the scale beam relatively to said lever.

10. In an automatic weighing machine, the combination of a scale pan having a pivoted bottom, a weighted lever normally tending to hold the bottom closed, an arm connected to said bottom to move with it, a pivoted latch engaging said arm to hold the bottom in closed position, a solenoid included in a normally open circuit and having a core adapted when the solenoid is energized, to strike said latch and permit the bottom to open, and means controlled by the movement of the scale pan for closing the solenoid circuit.

In witness whereof, I have signed my name to the foregoing specification in the presence of two subscribing witnesses.

THOMAS ROMER WEYANT.

Witnesses:
H. R. BAUER,
WM. W. ROBERTS.